April 30, 1957     O. B. McKINZIE     2,790,366
PLOW PILOT

Filed May 27, 1954     2 Sheets-Sheet 2

INVENTOR.
OTIS B. McKINZIE,
BY: Harold B. Hood.
ATTORNEY.

United States Patent Office 2,790,366
Patented Apr. 30, 1957

2,790,366

PLOW PILOT

Otis B. McKinzie, Lizton, Ind.

Application May 27, 1954, Serial No. 432,784

5 Claims. (Cl. 97—46.81)

The present invention relates to tractor-drawn implements and particularly to means for controlling the working depth of such an implement.

Various expedients have heretofore been used to control the working depth of such an implement, one being the provision of a ground-engaging wheel, or shoe, supported directly from the frame of the implement. In such a structure, practically the entire weight of the implement is supported by such wheel, the implement being moved up and down, relative to the tractor, in response to movement of the wheel as it rolls over slight rises and depressions in the terrain. But the very fact that this depth-control wheel does support practically the entire implement weight constitutes a major disadvantage of the device.

Tractors used today are not heavy enough in themselves to maintain proper traction on rough terrain. It is desirable, therefore, to support at least a part of the implement weight on the tractor to increase the traction of the tractor wheels. This is impossible in the device just described. Elaborate hydraulic mechanisms have been devised for raising and lowering the implement automatically in an attempt to maintain a constant, predetermined draft on the tractor. Such mechanisms, however, have been costly and inadequate in most instances.

The primary object of this invention is, therefore, to provide a relatively simple and inexpensive depth control mechanism of such character that only a small part of the weight of the implement will rest on the ground-engaging wheel, the major portion of such weight being transferred by such mechanism to the tractor.

Further objects of the invention will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
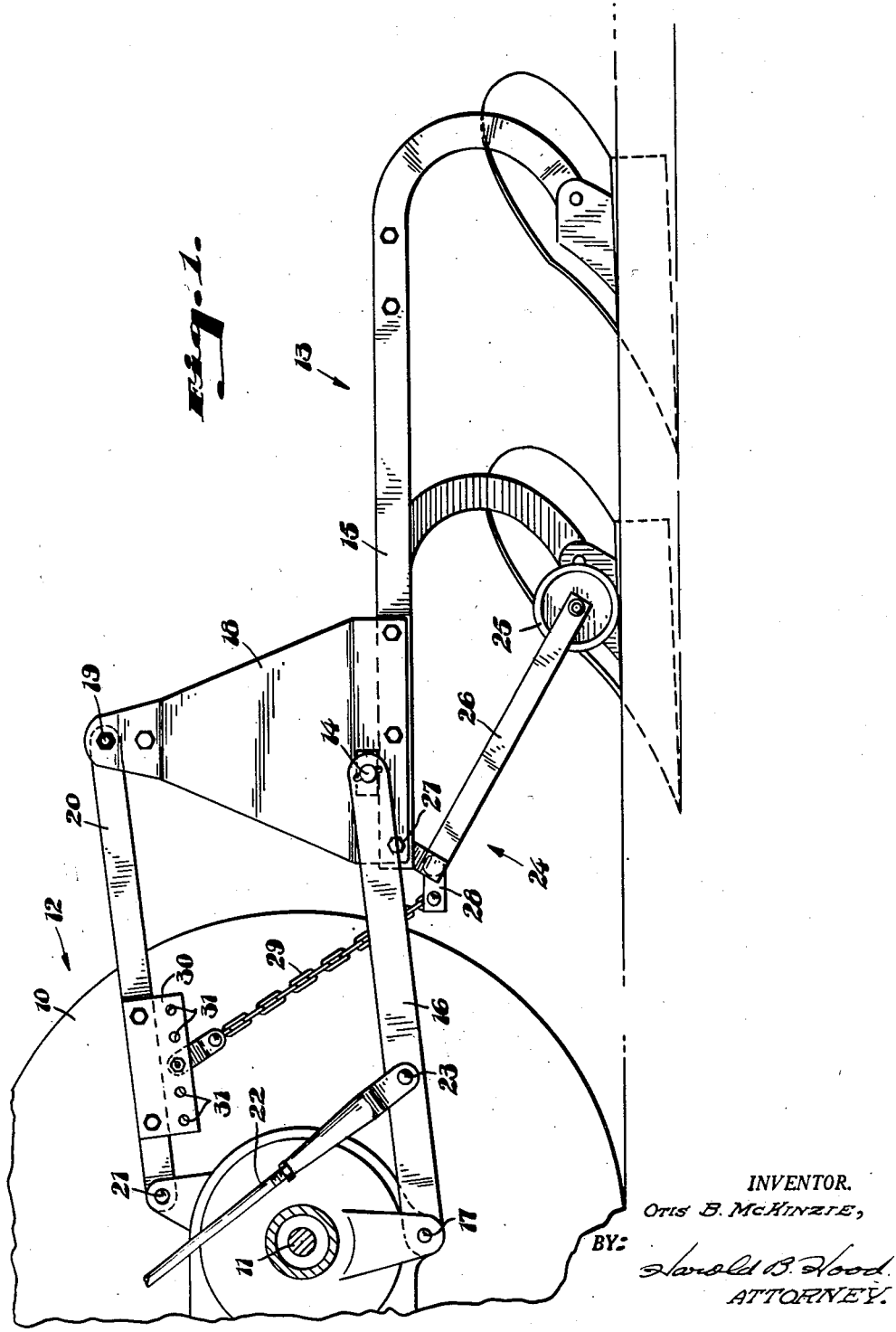
Figure 2:
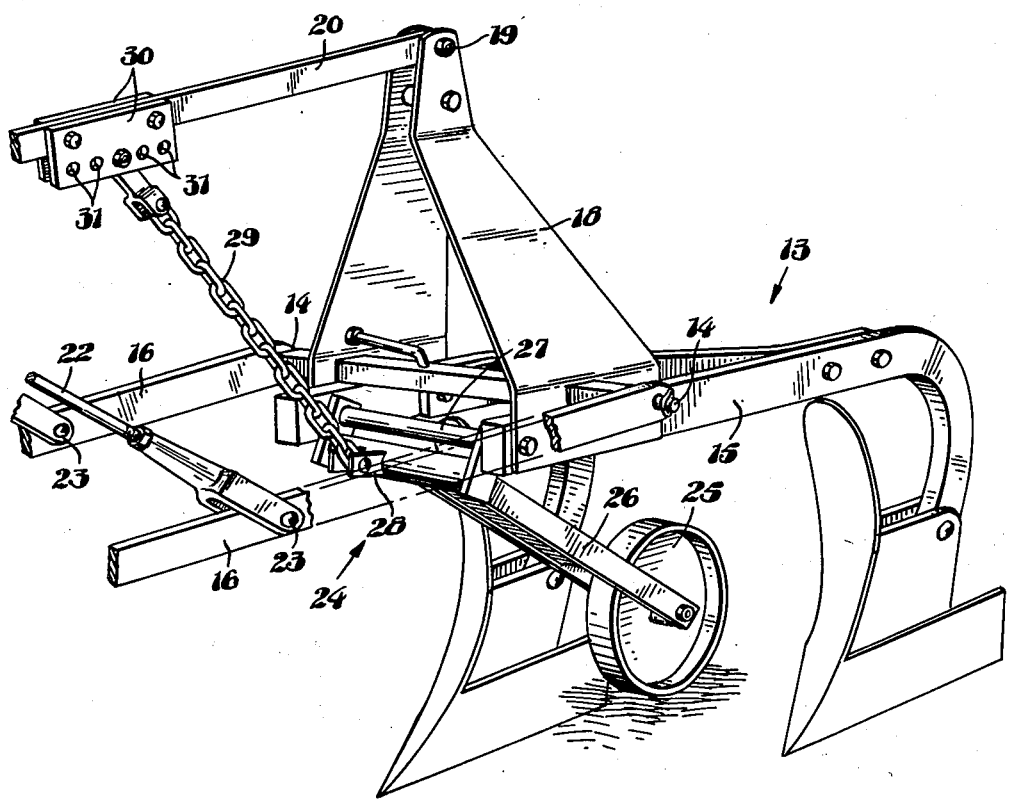

Fig. 1 is a side elevation of a plow shown connected to a tractor and including my depth control mechanism; and Fig. 2 is a perspective view of the plow of Fig. 1 showing more clearly the manner in which my depth control mechanism is supported thereon.

Referring more particularly to the drawings, and especially to Fig. 1, it will be seen that I have illustrated, somewhat diagrammatically, the rear wheels 10 and the axle 11 of a tractor 12. An implement, here shown as plow 13, is adapted to be connected to the tractor in a manner such that the implement can move up and down relative to the tractor.

One such connection for an implement is illustrated wherein the implement is provided with a pair of oppositely, laterally projecting trunnions 14 carried near the forward end of the implement frame 15. A pair of arm members 16 each has one end journalled on one of said trunnions and the opposite end pivoted to tractor 12 as at 17.

Implement frame 15 is provided with a pedestal portion 18 supporting a pivot pin 19 above trunnions 14. A link 20 has one end journalled on pin 19 and the opposite end pivoted to tractor 12 as at 21.

It will be seen that such an arrangement provides a tow connection between the implement and the tractor while permitting said implement to move freely up and down relative to the tractor. It will be noted, also, that this particular towing arrangement tends to maintain implement frame 15 in a relatively horizontal attitude as it is so moved up and down.

In such an arrangement, means are usually provided for raising implement 13 when it is desired to move it from place to place. Such means is here indicated by a rod 22 pivoted to each arm 16, as at 23 and moved axially by means of hydraulic cylinders (not shown).

As stated above, it is necessary that some means be provided for limiting the working depth of plow 13. Such an implement is usually self-feeding—that is it has a tendency to force itself into the ground as it is moved forward. Means must, therefore, be provided to halt this downward movement of the plow when it reaches the required depth, and thereafter to raise and lower the plow slightly, as it is moved over rough terrain, to maintain a uniform furrow depth. This can be accomplished by the provision of a wheel supported directly from frame 15, but with the resultant disadvantage pointed out above.

My invention is based upon the concept of supporting the weight of the implement on a lever, intermediate the ends thereof, the rear end of such lever being supported on the ground-engaging wheel and the forward end of the lever being supported on the tractor. In this way, the weight of the implement will be divided between the ground-engaging wheel and the tractor in a proportion depending upon the location of the supporting point on the lever. By locating such point very near the forward end of the lever, the greater part of the implement weight will be supported on the tractor while only a fraction of such weight will be supported on the ground-engaging wheel.

I have accomplished this result by means of the mechanism indicated generally by the reference numeral 24. The ground-engaging wheel 25 is supported on the rear end of a lever 26. Implement frame 15 is provided, near trunnions 14, with a pivot pin 27. I have found that for optimum results, this pin should be located slightly ahead of trunnions 14. Lever 26 is journalled for oscillation about pin 27 at a point on said lever spaced slightly from the forward end thereof. Lever 26 is provided with a forward extension 28 projecting beyond the pivot point 27.

It will be noted that in such structure, the weight and downward force of the plow 13 is supported entirely on lever 26 at the pivot point 27. This weight is then distributed between the opposite ends of lever 26 in a proportion depending upon the relationship between the lengths of lever 26 behind and ahead of pivot point 27. In the illustrated embodiment, this proportion is approximately eight to one resulting in approximately one-eighth of the weight being supported on wheel 25 and seven-eighths of such weight being transmitted to the forward lever extension 28. If the forward lever extension is now connected to tractor 12, this seven-eighths of the weight will be transmitted to the tractor, thereby greatly increasing the traction of wheels 10.

I have connected lever extension 28 to tractor 12 through the medium of a length of chain 29 fixed at one end to said extension and at the opposite end to the link 20 closely adjacent the pivot point 21. I prefer to so connect chain 29 to link 20 instead of directly to tractor 12 since, by so doing, the implement can be disconnected from the tractor by removing pivot pin 21 without disturbing the mounting for the mechanism 24.

In order to be able to vary the working depth of plow 13, I provide a bracket 30 fixed to link 20 and having a plurality of axially spaced anchorage holes 31. The chain 29 can be selectively fixed in such holes to vary the minimum distance of wheel 25 from implement frame 15.

As plow 13 is moved forward, only about one-eighth of the implement weight is supported on wheel 25, the remainder being transmitted through chain 29 to the tractor. Should the wheel 25 encounter a slight rise in the ground, it will exert a torque on lever 26 about the pivot pin 27 tending to move the forward lever extension 28 down. Since such downward movement of said extension is resisted by chain 29, an upward force will be applied to implement 13 at pivot 27 of approximately eight times the force tending to raise wheel 25, such force being sufficient to raise the implement. A correspondingly large downward force will be exerted in chain 29 which will be transmitted to tractor 12 thereby maintaining the traction of wheels 10.

I claim as my invention:

1. In combination, a tractor, an implement including a frame having a pair of oppositely projecting trunnion means and pivot means supported thereon above said trunnion means, a pair of arm members lying in a common plane and each journalled at one end on the respective trunnion means and pivotally supported at the opposite end on said tractor, link means supported at one end on said pivot means and pivotally supported at the opposite end on said tractor, said arm members and said link means providing a tow-connection between said tractor and said implement while permitting movement of said implement up and down relative to said tractor, and means for limiting such downward movement of said implement comprising a ground-engaging member, lever means supported at one end on said ground-engaging member and extending forwardly and upwardly herefrom toward said tractor, fulcrum means connected to said frame near said trunnion means and operatively engaging said lever means at a point spaced from the forward end thereof, and means supporting the forward end of said lever means from said link means at a point closely adjacent said tractor.

2. The combination of claim 1 in which said fulcrum means is located between said trunnion means and said tractor.

3. The combination of claim 1 in which said fulcrum means engages said lever means at a point nearer to the forward end of said lever means than to said ground-engaging member.

4. The combination of claim 1 in which said link means is provided with a plurality of axially spaced anchorage points closely adjacent said tractor, said means supporting the forward end of said lever means being selectively securable to said link means at various ones of said anchorage points to vary the uppermost limit of movement of said ground-engaging member relative to said implement.

5. An implement of the character described comprising a frame providing laterally projecting trunnion means and pivot means spaced above said trunnion means, link means journalled on said pivot means and extending forwardly therefrom for swinging movement about said pivot means in a substantially vertical plane, draft means journalled on said trunnion means and extending forwardly therefrom for similar swinging movement, and control means for said implement comprising a ground-engaging member, lever means supported at one end on said ground-engaging member and extending forwardly and upwardly therefrom, fulcrum means carried by said implement frame near said trunnion means, said lever means being journalled, intermediate its ends, for swinging movement about said fulcrum means in a substantially vertical plane, said lever means extending forwardly beyond said fulcrum means a distance substantially less than the length of said lever means between said fulcrum means and said ground-engaging member, and means providing a connection between said forward end of said lever means and said link means at a point on said link means closely adjacent the free end of said link means.

References Cited in the file of this patent

UNITED STATES PATENTS

| | | |
|---|---|---|
| 1,637,811 | Ferguson | Aug. 2, 1927 |
| 2,531,768 | Cline et al. | Nov. 28, 1950 |
| 2,534,761 | Englund | Dec. 19, 1950 |
| 2,621,575 | Berg | Dec. 16, 1952 |
| 2,704,015 | Wilson | Mar. 15, 1955 |